(12) United States Patent
Zhan et al.

(10) Patent No.: US 8,321,488 B2
(45) Date of Patent: Nov. 27, 2012

(54) SINGULAR VALUE DECOMPOSING METHOD AND RELATED SINGULAR VALUE DECOMPOSING DEVICE

(75) Inventors: Cheng-Zhou Zhan, Taipei County (TW); Yen-Liang Chen, Taipei (TW); Ting-Jhun Jheng, Taipei County (TW); An-Yeu Wu, Taipei (TW)

(73) Assignees: Mediatek Inc., Science-Based Industrial Park, Hsin-Chu (TW); National Taiwan University, Taipei (TW)

( * ) Notice: Subject to any disclaimer, the term of this patent is extended or adjusted under 35 U.S.C. 154(b) by 1058 days.

(21) Appl. No.: 12/264,258

(22) Filed: Nov. 4, 2008

(65) Prior Publication Data

US 2010/0111213 A1    May 6, 2010

(51) Int. Cl.
*G06F 17/16* (2006.01)
(52) U.S. Cl. .......................................... 708/200
(58) Field of Classification Search .................. None
See application file for complete search history.

(56) References Cited

U.S. PATENT DOCUMENTS

| 5,615,288 | A   | * | 3/1997  | Koshi et al. ................ 382/248 |
| 7,773,686 | B2  | * | 8/2010  | Shida et al. ................ 375/267 |
| 2008/0123769 | A1 | * | 5/2008  | Nakao ......................... 375/267 |
| 2009/0274236 | A1 | * | 11/2009 | Mihota ........................ 375/267 |
| 2010/0048232 | A1 | * | 2/2010  | Hwang et al. ............... 455/501 |
| 2010/0138715 | A1 | * | 6/2010  | Motoyoshi .................. 714/749 |

* cited by examiner

*Primary Examiner* — David H Malzahn
(74) *Attorney, Agent, or Firm* — Winston Hsu; Scott Margo (57) ABSTRACT

A method for performing a singular value decomposition (SVD) upon a matrix. The method includes the steps of: (a) simplifying the matrix to derive a simplified matrix; (b) performing an iterative matrix multiplication upon the simplified matrix to generate an iterated matrix; (c) extracting a vector of the iterated matrix according to an iteration number of the iterative matrix multiplication; (d) de-correlating the simplified matrix from the vector to update the simplified matrix; (e) repeating steps (b), (c), and (d) until a predetermined number of vectors have been derived; and (f) storing a first unitary matrix determined according to the predetermined number of vectors in the singular value decomposition.

20 Claims, 4 Drawing Sheets

SINGULAR VALUE DECOMPOSING METHOD AND RELATED SINGULAR VALUE DECOMPOSING DEVICE

BACKGROUND

The present invention relates to a singular value decomposing method and related device, and more particularly to a singular value decomposing method having fast-convergence and fewer computations, and a device thereof.

Figure 1:
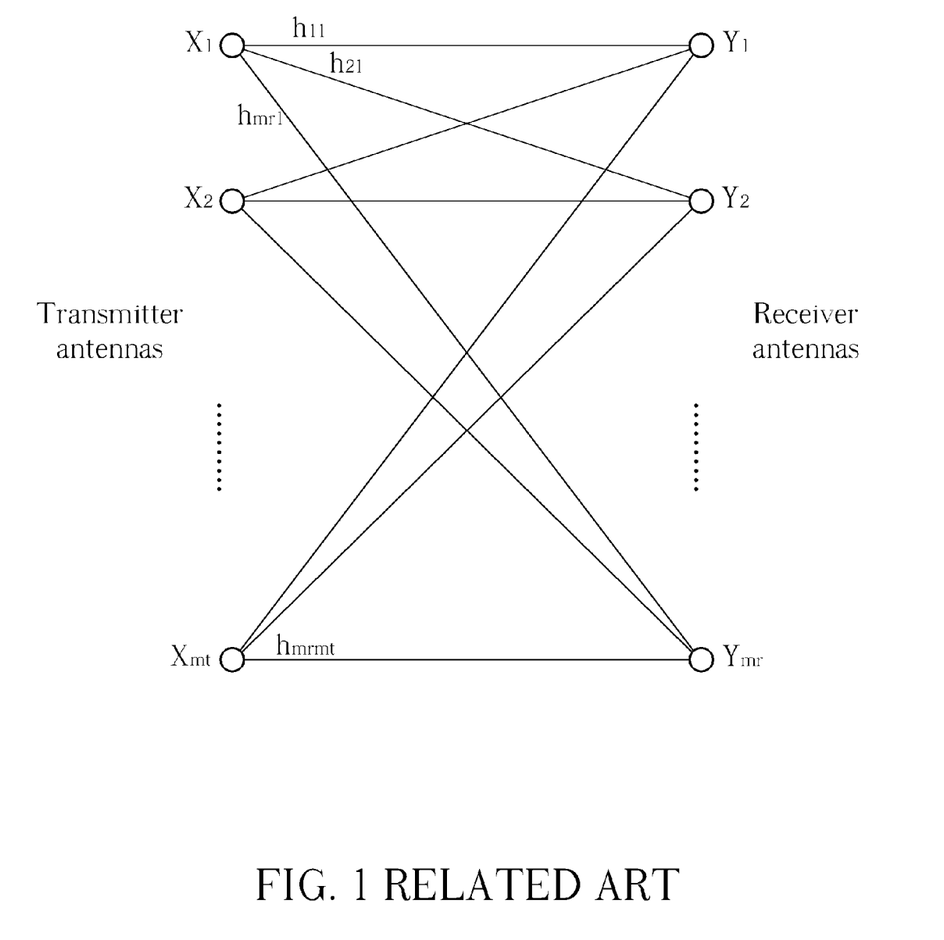
FIG. 1 is a diagram illustrating channels in antenna arrays of a conventional MIMO system.

In wireless communication systems, a multiple-input multiple-output (MIMO) transceiver utilizing antenna arrays can significantly enhance the throughput of the transmission data as shown in FIG. 1. FIG. 1 is a diagram illustrating the channels in the antenna arrays in a conventional MIMO system. The transmitter has M t antennas and the receiver has M r antennas. Each of the receiver's antennas $Y_1 \sim Y_{Mr}$ may receive the signal transmitted from each of the transmitter's antennas $X_1 \sim X_{Mt}$. In other words, the first transmitter's antennas $X_1$ may have M r transmitting channels $h_{11}$, $h_{12}$, ..., $h_{mr1}$, and the second transmitter's antennas $X_2$ also have M r transmitting channels $h_{12}$, $h_{22}$, ..., $h_{mr2}$, and so on. Therefore, the antennas in the MIMO system are utilized to increase the diversity against multi-path fading or spatially separate devices. Furthermore, the linearity of the signal is proportional to the number of antennas utilized at both the transmitter and the receiver. The interference that emerges between the antennas is the main problem of the MIMO system. To solve the inter-interference problem of the MIMO system, various processes are utilized. The singular value decomposition (SVD) process is considered to have the best performance in the elimination of interference. However, the conventional algorithms to solve the singular value decomposition require a large amount of iterative computations, which consequently increase both the converging time and the hardware complexity.

SUMMARY OF THE INVENTION

One of the objectives of the present invention is to provide a singular value decomposing method with fast-convergence and fewer computations, and a related device.

According to an embodiment of the present invention, a method for performing a singular value decomposition (SVD) upon a matrix is disclosed. The method comprises the following steps: (a) simplifying the matrix to derive a simplified matrix; (b) performing an iterative matrix multiplication upon the simplified matrix to generate an iterated matrix; (c) extracting a vector of the iterated matrix according to an iteration number of the iterative matrix multiplication; (d) de-correlating the simplified matrix from the vector to update the simplified matrix; (e) repeating steps (b), (c), and (d) until a predetermined number of vectors have been derived; and (f) storing a first unitary matrix determined according to the predetermined number of vectors in the singular value decomposition.

According to a second embodiment of the present invention, a singular value decomposing device to perform a singular value decomposition (SVD) upon a matrix is disclosed. The singular value decomposing device comprises a first processing circuit, a second processing circuit, a third processing circuit, a fourth processing circuit, a switch circuit, and a storing module. The first processing circuit simplifies the matrix to derive a simplified matrix. The second processing circuit couples to the first processing circuit for performing an iterative matrix multiplication upon the simplified matrix to generate an iterated matrix. The third processing circuit couples to the second processing circuit for extracting a vector of the iterated matrix according to an iteration number of the iterative matrix multiplication. The fourth processing circuit couples to the third processing circuit for de-correlating the simplified matrix from the vector to update the simplified matrix. The switch circuit couples between the fourth processing circuit and the second processing circuit for selectively coupling the simplified matrix to the second processing circuit until a predetermined number of vectors have been derived. The storing module couples to the third processing circuit for storing a first unitary matrix determined according to the predetermined number of vectors in the singular value decomposition.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
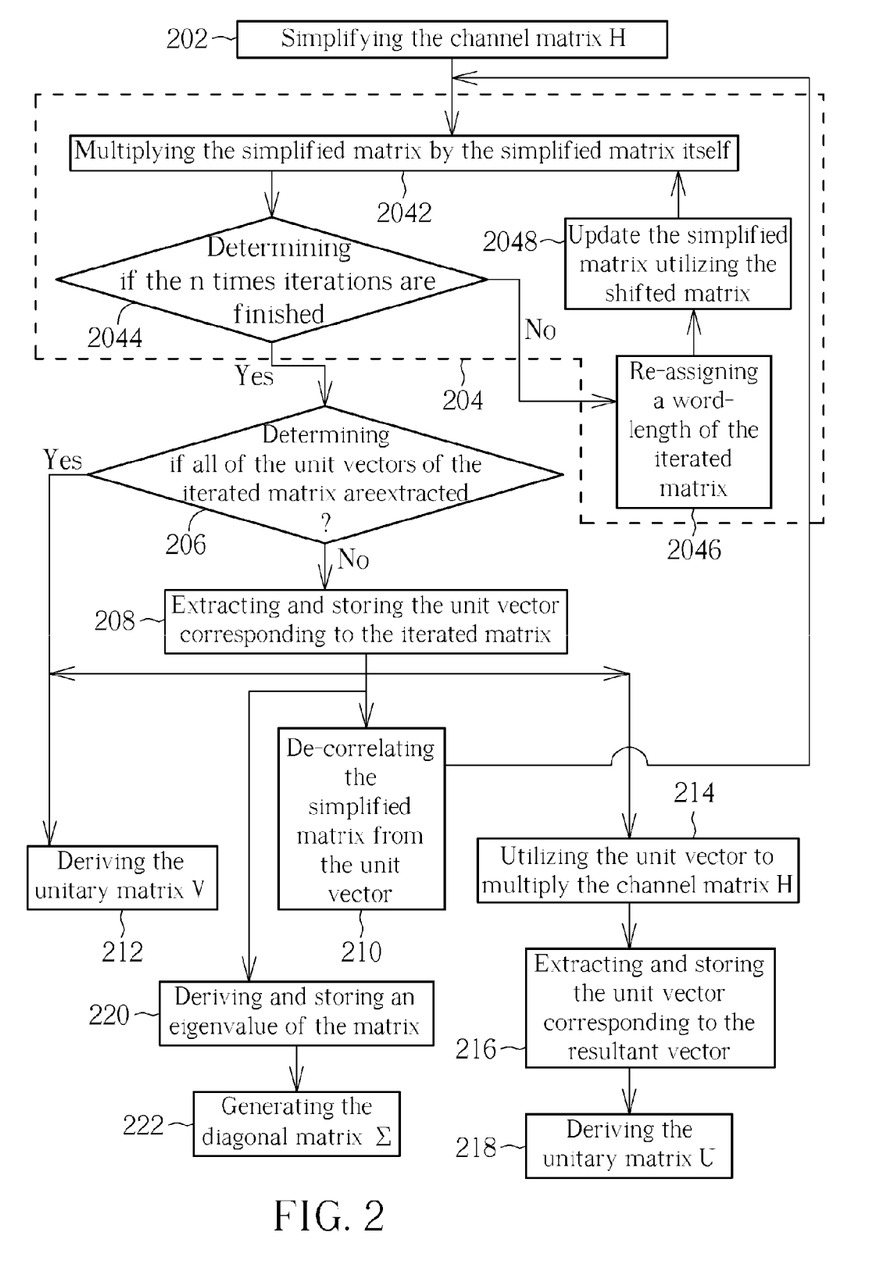
FIG. 2 is a flowchart illustrating a singular value decomposition (SVD) method upon a channel matrix according to an embodiment of the present invention.

Please refer to FIG. 2. FIG. 2 is a flowchart illustrating a singular value decomposition (SVD) method 200 upon a channel matrix H, wherein the channel matrix H is a complex matrix modeled by a wireless Multi-input Multi-output (MIMO) system. According to the embodiment of the present invention, the channel matrix H is embodied by an m*m complex matrix, $m \geq 1$. In other words, the channel matrix H is modeled by the channel between m transmitter antennas and m receiver antennas, but this is for the purpose of illustration and not meant to be a limitation of the present invention. In other words, those skilled in this art will readily understand that the present invention can also be applied in the channel matrix modeled between any number of transmitter antennas and any number of receiver antennas. Furthermore, the singular value decomposition method 200 of the present invention is for decomposing the channel matrix H into the form of $U\Sigma V^T$, where the matrices U, V are unitary matrix, the matrix $\Sigma$ is a diagonal matrix, and $V^T$ is the transpose conjugate matrix of the matrix V. Provided that substantially the same result is achieved, the steps of the flowchart shown in FIG. 2 need not be in the exact order shown and need not be contiguous; that is, other steps can be intermediate. The singular value decomposition method 200 comprises the following steps:

Step 202: simplify the channel matrix H to derive a simplified matrix;

Step 204: perform n times iterations of an iterative matrix multiplication upon the simplified matrix to generate an iterated matrix; when the n times iterations is finished, go to step 206, in which n≧1 and one iteration of the iterative matrix multiplication comprises the following steps:

Step 2042: multiply the simplified matrix by the simplified matrix itself to generate the iterated matrix;

Step 2044: determine if the n times iterations are finished; if yes, go to step 206, if no, go to step 2046;

Step 2046: re-assign a word-length for storing the iterated matrix to generate a shifted matrix; and Step 2048: update the simplified matrix utilizing the shifted matrix, go to step 2042;

Step 206: perform a termination checking upon the iterated matrix to determine if all of the unit vectors of the iterated matrix are extracted; if the termination checking shows that all of the unit vectors of the iterated matrix are extracted, go to step 212, if the termination checking shows that not all of the unit vectors of the iterated matrix are extracted, go to step 208;

Step 208: extract and store the unit vector corresponding to the iterated matrix, then proceed to steps 210, 212, 214, and 220;

Step 210: de-correlate the simplified matrix from the unit vector(s) extracted in step 208 to generate a de-correlated matrix and update the simplified matrix utilizing the de-correlated matrix, go to step 204;

Step 212: derive the unitary matrix V of the matrix composed of the plurality of unit vectors extracted in step 208;

Step 214: utilize the unit vector extracted in step 208 to multiply the channel matrix H to generate a resultant vector;

Step 216: extract and store the unit vector corresponding to the resultant vector, go to step 218 and step 220;

Step 218: derive the unitary matrix U of the matrix composed of the plurality of unit vectors generated in step 216;

Step 220: derive and store an eigenvalue of the matrix according to the unit vector generated in step 208 and the unit vector generated in step 216;

Step 222: generate the diagonal matrix Σ by utilizing the plurality of eigenvalues generated in step 220.

Initially, since three variable matrices exist in the channel matrix H, the singular value decomposition method 200 reduces one of the variable matrices of the channel matrix H when the channel matrix H is received in order to simplify the channel matrix H. Therefore, in step 202, a transpose conjugate operation is first performed upon the channel matrix H to generate a transposed matrix $H^T$; and then the channel matrix H is multiplied by the transposed matrix $H^T$ to generate the simplified matrix P, as shown in the following equation:

$$P = H^T H \qquad (1)$$
$$= V\Sigma^2 V^T$$
$$= \sum_M \sigma_i^2 v_i v_i^H,$$

wherein M is the rank of the channel matrix H, $\sigma_i$, which composes the diagonal matrix Σ, is the i-th singular value in descending order, meaning that $\sigma_1 > \sigma_2 > \ldots > \sigma_M$, and $v_i$ is the i-th column vector of the unitary matrix V. Please note that, although this embodiment is for simplifying the channel matrix H by eliminating the unitary matrix U, this is not meant to be the limitation of the present invention. Those skilled in this art will readily understand that the multiplication between the channel matrix H and the transposed matrix $H^T$ can be switched to generate the simplified matrix P that eliminates the unitary matrix V, i.e., $P = HH^T = U\Sigma^2 U^T$, which also falls within the scope of the present invention.

When the simplified matrix P is obtained, the iterative matrix multiplication is performed upon the simplified matrix P to generate an iterated matrix $P^{2^n}$ in the step 204, in which the n times iterations is performed in the iterative matrix multiplication. However, this is not meant to be the limitation of the present invention. In another embodiment of the present invention, the iterative matrix multiplication performs m times iterations upon the simplified matrix P to generate the iterated matrix of $P^{2m}$. The iterative matrix multiplication is illustrated in the following equation:

$$P^{2^n} = (H^T H)^{2^n} \qquad (2)$$
$$= (V\Sigma^2 V^T)^{2^n}$$
$$= V\Sigma^{2^{n+1}} V^T$$
$$= \sum_M \sigma_i^{2^{n+1}} v_i v_i^H,$$

Since the unitary matrix V does not vary after the n times iterations, it is obvious that the gap between the largest singular value $\sigma_1$ and other smaller singular values $\sigma_2, \ldots, \sigma_m$ will be enlarged after the n times iterations are performed upon the simplified matrix P. Therefore, the iterated matrix $P^{2^n}$ can be approximated as $\sigma_1^{2+1} v_1 v_1^T$, in which only the vector (i.e., $v_1$) that corresponds to the largest singular value $\sigma_1$ is left in the iterated matrix $P^{2^n}$. One iteration of the iterative matrix multiplication first multiplies the simplified matrix P by the simplified matrix P itself to generate the first order simplified matrix $P^2$ (i.e., step 2042), and then updates the first order simplified matrix $P^2$ to be the simplified matrix P for performing the next iteration. In practice, however, to avoid the overflow of the most significant bit (MSB) of the first order simplified matrix $P^2$, the step 2046 may require the iteration to re-assign a word-length for storing the first order simplified matrix $P^2$ and for generating a shifted matrix. Then, the shifted matrix is updated to be the simplified matrix P for performing the next iteration until the n times iterations are finished. In other words, a dynamic shift operation is performed upon each iterated matrix in the iteration of the iterative matrix multiplication. More specifically, in step 2046, all the elements in the simplified matrix P should be binary shifted t bits such that the maximum element of $|2^{t*}\{Re(P), Im(P)\}|$ can be expressed without losing its most significant bit. Furthermore, the step 2044 determines if the n times iterations are finished. If the n times iterations are not finished yet, the iteration must be performed until the n times iterations are completed. When the n times iterations are finished, meaning that the iterated matrix $P^{2^n} (\cong \sigma_1^{2^{n+1}} v_1 v_1^T)$ is obtained, the unit vector corresponding to the largest singular value $\sigma_1$ can be extracted from the iterated matrix $P^{2^n}$ in step 208. Before the unit vector can be extracted, termination checking is performed upon the iterated matrix $P^{2^n}$ in step 206 to determine if all of the unit vectors corresponding to all of the singular values have been extracted. If all of the unit vectors are extracted, the unitary matrix V of the matrix composed of the plurality of unit vectors is derived in step 212. Otherwise, the unit vector of the iterated matrix $P^{2^n}$ is extracted in step 208.

After the unit vector corresponding to the largest singular value $\sigma_1$ is obtained, the correlated components in the channel matrix H should be eliminated for deriving the next singular value and the corresponding unit vector. Therefore, the unit vector corresponding to the largest singular value $\sigma_1$ is de-correlated from the simplified matrix P in step 210 to generate a de-correlated matrix $P_d$ and the simplified matrix P is updated utilizing the de-correlated matrix $P_d$. The following equations illustrate the initial condition of the singular value decomposition method 200 of the present invention:

$$\begin{cases} \sum_M v_i v_i^T = I_M, \\ v_i^T v_j = 0, \forall i \neq j. \end{cases} \quad (3)$$

Therefore, after deriving the unit vectors corresponding to $v_1 \sim v_k$, the step 210 further subtracts the unit vectors corresponding to $v_1 \sim v_k$ from an identity matrix $I_M$ to generate a subtracted matrix $P_{sub}$; and the subtracted matrix $P_{sub}$ is multiplied by the simplified matrix P. Accordingly, the de-correlated matrix $P_d$ can be obtained through the following derivation:

$$\begin{aligned} P_d &= \left(I_M - \sum_{i=1}^{k} v_i v_i^T\right)(H^T H) \\ &= (v_{k+1} v_{k+1}^T + v_{k+2} v_{k+2}^T + \ldots)(\sigma_1^2 v_1 v_1^T + \sigma_2^2 v_2 v_2^T + \ldots) \\ &= (\sigma_{k+1}^2 v_{k+1} v_{k+1}^T + \sigma_{k+2}^2 v_{k+2} v_{k+2}^T + \ldots) \end{aligned}$$

Therefore, the de-correlated matrix $P_d$ can be utilized for deriving the unit vector corresponding to $v_{k+1}$ in step 204.

Since the iterated matrix $P^{2^n}$ is generated continuously in step 204, the unit vectors corresponding to the respective singular values $\sigma_1, \ldots, \sigma_m$ are obtained and stored one by one in step 208. When all of the unit vectors corresponding to the respective singular values $\sigma_1, \ldots, \sigma_m$ are obtained, a normalizing operation can be performed upon the unit vectors to generate the eigenvectors $v_1, \ldots, v_m$, respectively, in which the eigenvectors $v_1, \ldots, v_m$ are utilized to derive the unitary matrix V of the matrix (step 212). Accordingly, the unitary matrix V of the matrix can be obtained. Please note that the step 208 in conjunction with the step 212 is not a limitation of the present invention for obtaining the eigenvectors $v_1, \ldots, v_m$. In another embodiment of the present invention, each eigenvector $v_i$ is obtained through the normalization upon any column or row vector of the iterated matrix $P^{2^n}$ obtained in step 204. Furthermore, in another embodiment of the present invention, the eigenvector $v_i$ corresponding to the singular value $\sigma_i$ can be obtained by simply eliminating the portion of $\sigma_i^{2^{n+1}}$ of the iterated matrix $P^{2^n}(\cong \sigma_i^{2^{n+1}} v_i v_i^T)$.

Whenever the unit vector corresponding to the largest singular value $\sigma_i$ is obtained in step 208, the unit vector is further utilized to multiply the channel matrix H to generate a resultant vector $P_u$ in step 214 as illustrated in the following equation:

$$P_u = Hv_i = (U\Sigma V^T)v_i = (\Sigma_1^2 u_1 v_1^T + \Sigma_2^2 u_2 v_2^T + \ldots + \Sigma_m^2 u_m v_m^T)v_i = \Sigma_i^2 u_i \quad (4)$$

Similar to the step 208, the unit vector corresponding to the largest singular value $\sigma_1$ can be extracted from the resultant vector $P_u$ in step 216. Since the iterated matrix $P^{2^n}$ is generated continuously in step 204, the unit vectors corresponding to the respective singular values $\sigma_1, \ldots, \sigma_m$ are obtained and stored one by one in step 208. When all of the unit vectors corresponding to the respective singular values $\sigma_1, \ldots, \sigma_m$ are obtained, a normalizing operation can be performed upon the unit vectors to generate the eigenvectors $u_1, \ldots, u_m$, respectively, in which the eigenvectors $u_1, \ldots, u_m$ are utilized to derive the unitary matrix U of the matrix (step 218). Accordingly, the unitary matrix U of the matrix can be obtained. Please note that, in another embodiment of the present invention, each eigenvector $u_i$ is obtained through the normalization upon any column or row vector of the resultant vector $P_u$ obtained in step 214.

In addition, whenever the unit vectors (corresponding to $v_i$ and $u_i$ respectively) corresponding to the largest singular value $\sigma_i$ are obtained in step 208 and 216, the unit vectors are further utilized to multiply the channel matrix H to generate the singular value $\sigma_i$ in step 220 as illustrated in the following equation:

$$\sigma_i = u_i^T H v_i \quad (5)$$

When all of the singular value $\sigma_1 \sim \sigma_m$ are obtained, the diagonal matrix $\Sigma$ can be derived in step 222.

According to the above-mentioned disclosure of the present invention, the computation of the singular value decomposition method 200 is division free and square-root free. In other words, no division or square-root operation are performed in the singular value decomposition method 200, thereby lowering the total computational complexity (i.e., multiplication and add (MAC)) to decompose the channel matrix H and having the characteristic of fast-convergence. In addition, the singular value decomposition method 200 is reconfigurable to various sizes of channel matrices, such as 4*4 matrix or 4*3 matrix. Furthermore, since the eigenvectors $v_i$, $u_i$, and $\sigma_i$ can be derived separately in the embodiment of the present invention, the singular value decomposition method 200 possesses high parallelism compared with the conventional method.

Figure 3:
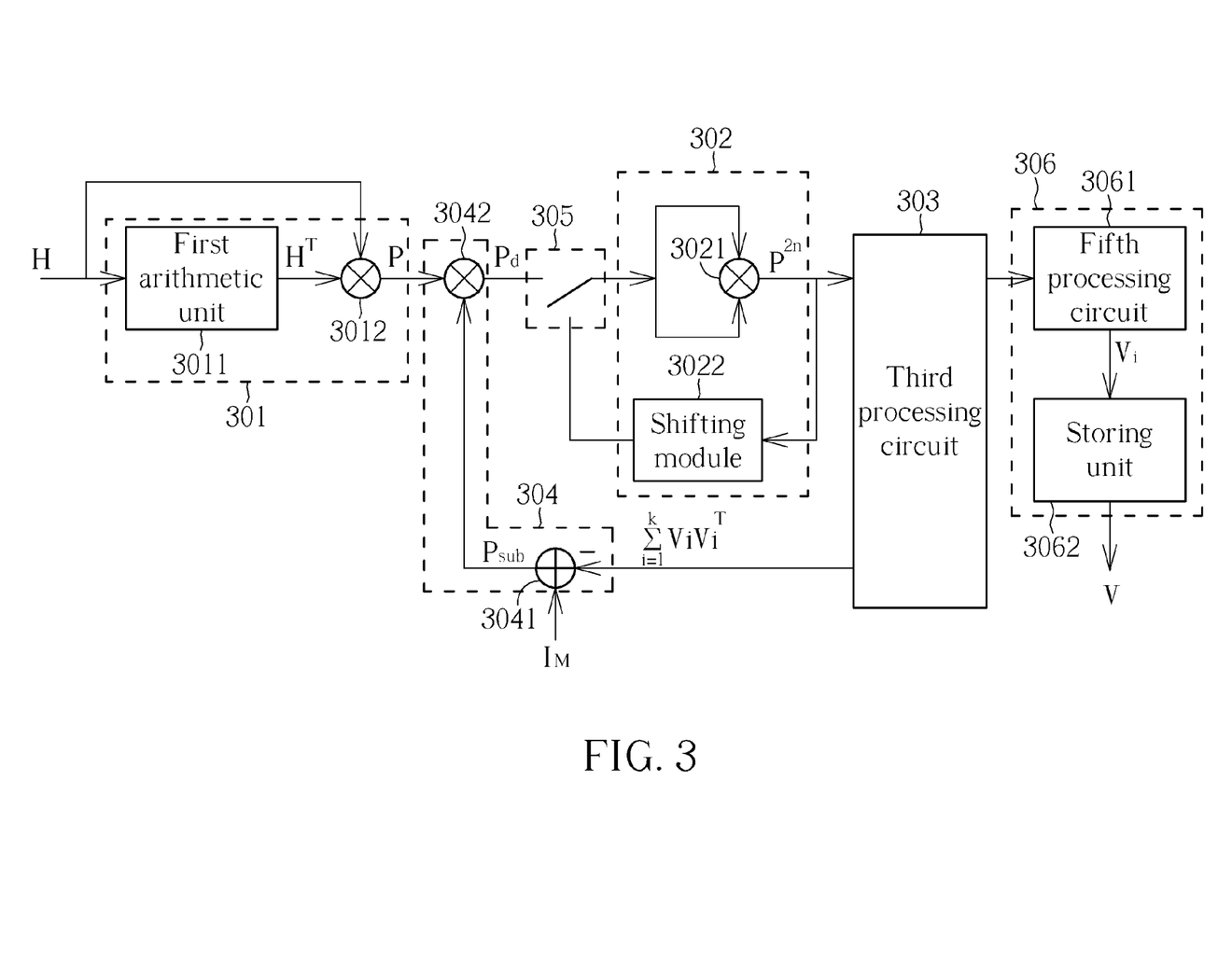
FIG. 3 is a diagram illustrating the singular value decomposing device according to a second embodiment of the present invention.

Please refer to FIG. 3. FIG. 3 is a diagram illustrating a singular value decomposing device 300 according to a second embodiment of the present invention. The singular value decomposing device 300 is utilized for performing a singular value decomposition (SVD) upon a channel matrix to generate a unitary matrix of the channel matrix. In order to describe the present invention more clearly, the singular value decomposing device 300 is utilized to decompose the channel matrix H for generating the unitary matrix V of the first embodiment as shown in FIG. 2. In other words, the channel matrix H is the complex matrix modeled by the wireless Multi-input Multi-output (MIMO) system, and the channel matrix H is an m*m complex matrix, where m≧1, which is modeled by the channel between m transmitter antennas and m receiver antennas, and both these examples are for the purposes of illustration and are not meant to be limitations of the present invention. The singular value decomposing device 300 comprises a first processing circuit 301, a second processing circuit 302, a third processing circuit 303, a fourth processing circuit 304, a switch circuit 305, and a storing module 306. The first processing circuit 301 receives the channel matrix H to simplify the channel matrix H to derive the simplified matrix P as illustrated in the above-mentioned equation (1). The second processing circuit 302 couples to the first processing circuit 301 for performing the n times iterations of the iterative matrix multiplication upon the simplified matrix P to generate the iterated matrix $P^{2^n}$ as illustrated in the above-mentioned equation (2). The third processing circuit 303 couples to the second processing circuit 302 for extracting a unit vector of the iterated matrix $P^{2^n}$ after n times iterations of the iterative matrix multiplication. The fourth processing circuit 304 couples to the third processing circuit 303 for de-correlating the simplified matrix P from the unit vectors extracted in the third processing circuit 303 to generate the de-correlated matrix $P_d$. The switch circuit 305 couples between the fourth processing circuit 304 and the second processing circuit 302 for selectively coupling the de-correlated matrix $P_d$ to the second processing circuit 302 until a predetermined number of unit vectors have been derived; and the storing module 306 couples to the third processing circuit 303 for storing the unitary matrix V determined according to the predetermined number of unit vectors extracted in the third processing circuit 303.

Furthermore, the first processing circuit 301 comprises a first arithmetic unit 3011 and a second arithmetic unit 3012. The first arithmetic unit 3011 performs a transpose conjugate operation upon the channel matrix H to generate a transposed matrix $H^T$, and the second arithmetic unit 3012 couples to the first arithmetic unit 3011 for multiplying the channel matrix H by the transposed matrix $H^T$ to generate the simplified matrix P. The second processing circuit 302 comprises a third arithmetic unit 3021, and a shifting module 3022. The third arithmetic unit 3021 multiplies the de-correlated matrix $P_d$ by the de-correlated matrix $P_d$ itself for n times to generate the iterated matrix $P^{2^n}$. The shifting module 3022 couples to the third arithmetic circuit 3021 for re-assigning a word-length for storing the iterated matrix $P^{2^n}$ to generate a shifted matrix, and updating the de-correlated matrix $P_d$ utilizing the shifted matrix until the iteration number is equal to the predetermined value, i.e., n iterations. The fourth processing circuit 304 comprises a fourth arithmetic unit 3041 and a fifth arithmetic unit 3042. The fourth arithmetic unit 3041 subtracts the eigenvectors (i.e., $$\sum_{i=1}^{k} v_i v_i^T$$

derived from the unit vectors extracted in the third processing circuit 303 by an identity matrix $I_M$ to generate a subtracted matrix $P_{sub}$. The fifth arithmetic unit 3042 multiplies the simplified matrix P by the subtracted matrix $P_{sub}$ to generate another de-correlated matrix $P_d$. The storing module 306 comprises a fifth processing circuit 3061 and a storing unit 3062. The fifth processing circuit 3061 normalizes the unit vectors extracted in the third processing circuit 303 to derive a plurality of eigenvectors $v_1 \sim v_m$, respectively. The storing unit 3062 couples to the fifth processing circuit 3061 for storing the unitary matrix V composed of the plurality of eigenvectors $v_1 \sim v_m$.

Initially, the switch circuit 305 switches to the fourth processing circuit 304 for coupling the simplified matrix P to the second processing circuit 302. Then, the switch circuit 305 switches to the shifting module 3022. Accordingly, the third arithmetic unit 3021 multiplies the simplified matrix P by the simplified matrix P itself to generate the first order simplified matrix $P^2$, and the first order simplified matrix $P^2$ is then inputted to the shifting module 3022, wherein the shifting module 3022 re-assigns the word-length of the simplified matrix $P^2$ to avoid the overflow of the most significant bit (MSB) of the first order simplified matrix $P^2$. Then, the shifted matrix is generated, and the switch circuit 305 couples the shifted matrix to the third arithmetic unit 3021 for performing the next iteration until the n iteration is finished. In other words, the shifting module 3022 performs the dynamic shift operation upon each iterated matrix in the iteration of the iterative matrix multiplication. More specifically, all the elements in the simplified matrix P should be binary shifted t bits such that the maximum element of $|2^{t}*\{Re(P), Im(P)\}|$ can be expressed without losing its most significant bit. When the second processing circuit 302 and the switch circuit 305 finish the n times iterations, the third processing circuit 303 further performs the termination checking upon the iterated matrix $P^{2^n}$ to determine if all of the unit vectors corresponding to all of the singular values $\sigma_1, \ldots, \sigma_m$ have been extracted. If not all of the unit vectors corresponding to all of the singular values $\sigma_1, \ldots, \sigma_m$ have been extracted, the third processing circuit 303 extracts the unit vectors of the iterated matrix $P^{2^n}$. In this case, when the n times iterations are finished, the iterated matrix $P^{2^n} (\cong \sigma_1^{2^{n+1}} v_1 v_1^T)$ is obtained, and the unit vector corresponding to the largest singular value $\sigma_1$ can then be extracted from the iterated matrix $P^{2^n}$ in the third processing circuit 303. After deriving the unit vectors corresponding to $v_1 \sim v_k$, the fourth processing circuit 304 performs the following calculation to generate the de-correlated matrix $P_d$:

$$P_d = \left(I_M - \sum_{i=1}^{k} v_i v_i^T\right)(H^T H)$$
$$= (v_{k+1} v_{k+1}^T + v_{k+2} v_{k+2}^T + \ldots)(\sigma_1^2 v_1 v_1^T + \sigma_2^2 v_2 v_2^T + \ldots)$$
$$= (\sigma_{k+1}^2 v_{k+1} v_{k+1}^T + \sigma_{k+2}^2 v_{k+2} v_{k+2}^T + \ldots)$$

wherein the second arithmetic unit 3041 subtracts the eigenvectors (i.e., $$\sum_{i=1}^{k} v_i v_i^T$$

derived from the unit vectors extracted in the third processing circuit 303 by the identity matrix $I_M$, and the third arithmetic unit 3042 multiplies the simplified matrix P by the subtracted matrix $P_{sub}$ to generate another de-correlated matrix $P_d$. Then, the switch circuit 305 couples the de-correlated matrix $P_d$ to the second processing circuit 302 for deriving the unit vector corresponding to $v_{k+1}$.

When the termination checking of the third processing circuit 303 determines that all of the unit vectors corresponding to all of the singular values $\sigma_1, \ldots, \sigma_m$ have been extracted, the fifth processing circuit 3061 normalizes the unit vectors extracted in the third processing circuit 303 to derive a plurality of eigenvectors $v_1 \sim v_m$, respectively. The storing unit 3062 couples to the fifth processing circuit 3061 for storing the unitary matrix V composed of the plurality of eigenvectors $v_1 \sim v_m$. Accordingly, the unitary matrix V of the channel matrix H can be obtained. Please note that the eigenvector $v_i$ corresponding to the singular value $\sigma_i$ can also be obtained without the normalization in the fifth processing circuit 3061. In other words, in another embodiment of the present invention, the fifth processing circuit 3061 simply eliminates the portion of $\sigma_i^{2^{n+1}}$ of the iterated matrix $P^{2^n}$ ($\cong \sigma_i^{2^{n+1}} v_1 v_1^T$) to obtain the eigenvector $v_i$.

Figure 4:
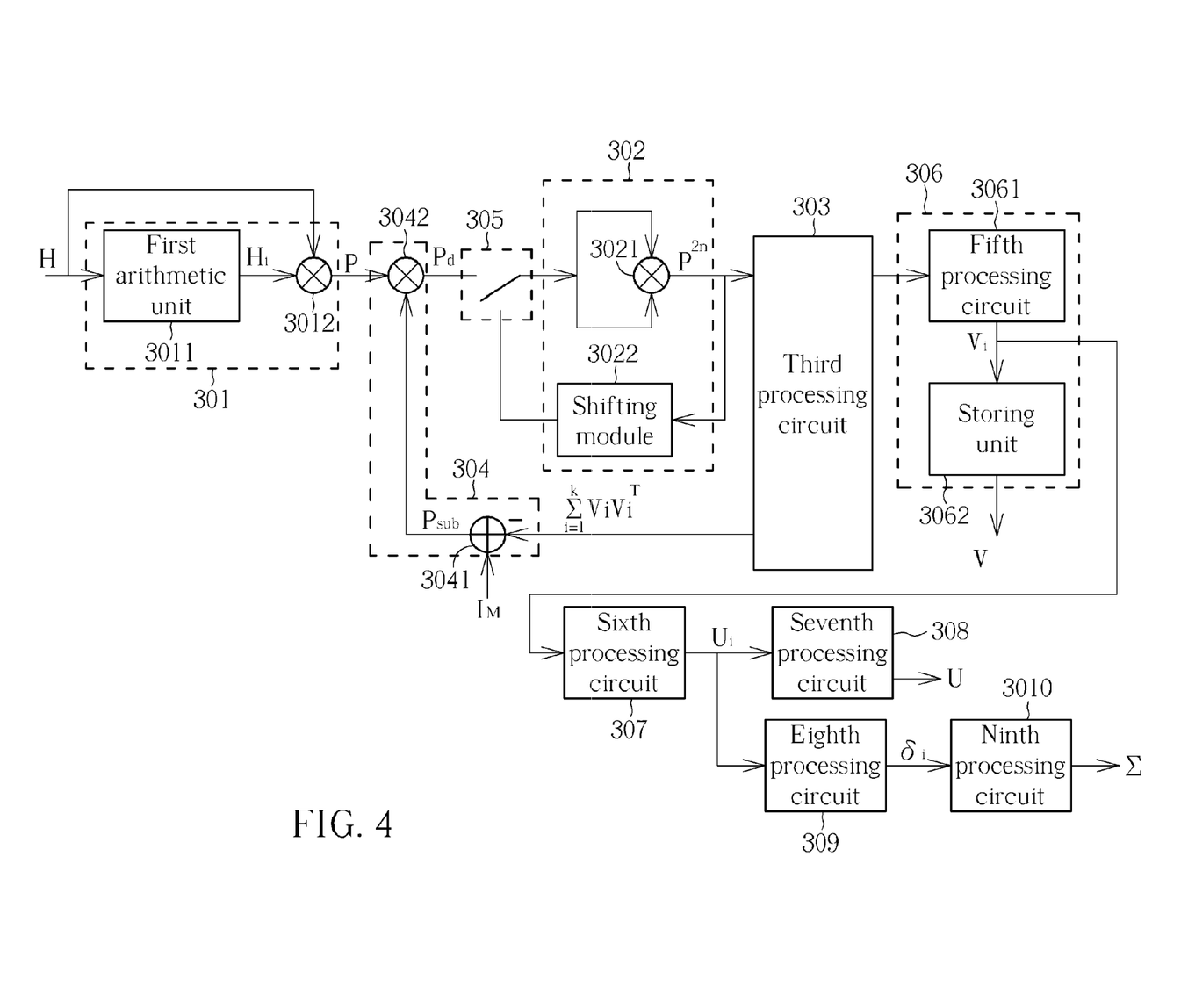
FIG. 4 is a diagram illustrating the singular value decomposing device according to a third embodiment of the present invention.

Please refer to FIG. 3 in conjunction with FIG. 4. FIG. 4 is a diagram illustrating a singular value decomposing device

400 according to a third embodiment of the present invention. The singular value decomposing device 400 is utilized for performing the singular value decomposition (SVD) upon the channel matrix H to generate the unitary matrix V, the unitary matrix U, and the diagonal matrix Σ of the channel matrix H as shown in FIG. 2. Similarly, the channel matrix H is the complex matrix modeled by the wireless Multi-input Multi-output (MIMO) system, and the channel matrix H is an m*m complex matrix, where m≧1, which is modeled by the channel between m transmitter antennas and m receiver antennas, and both these examples are for the purposes of illustration and are not meant to be limitations of the present invention. Not including the components of the singular value decomposing device 300, the singular value decomposing device 400 further comprises a sixth processing circuit 307, a seventh processing circuit 308, an eighth processing circuit 309, and a ninth processing circuit 3010. The sixth processing circuit 307 couples to the storing module 306 for multiplying the channel matrix H by the eigenvectors $v_i$ to generate the resultant vectors $P_u$ respectively. The seventh processing circuit 308 couples to the sixth processing circuit 307 for deriving the unitary matrix U of the channel matrix H, wherein the unitary matrix U is composed of a plurality of normalized vectors (i.e., eigenvectors) $u_i$ generated from normalizing the resultant vectors $P_u$ respectively. The eighth processing circuit 309 couples to the sixth processing circuit 307 for multiplying the channel matrix H by the eigenvectors $v_i$ obtained in the storing module 306 and eigenvectors $u_i$ obtained in the sixth processing circuit 307 to generate the corresponding singular values $\sigma_i$. The ninth processing circuit 3010 couples to the eighth processing circuit 309 for deriving the diagonal matrix Σ of the channel matrix H according to the singular values $\sigma_i$ obtained in the eighth processing circuit 309.

According to the third embodiment as shown in FIG. 3, once eigenvectors $v_i$ are generated, the sixth processing circuit 307 multiplies the channel matrix H by the eigenvectors $v_i$ to obtain the resultant vector $P_u$ as illustrated by the equation (4), i.e., $P_u = \sigma_i^2 u_i$. After normalizing the resultant vector $P_u$, the eigenvectors $u_i$ can be obtained. Please note that the eigenvectors $u_i$ can also be obtained without performing the normalization upon the resultant vector $P_u$. In another embodiment of the present invention, the eigenvector $u_i$ corresponding to the singular value $\sigma_i$ can be obtained by simply eliminating the portion of $\sigma_i^2$ of the iterated matrix $P_u$ (i.e., $\sigma_i^2 u_i$).

Then, the unitary matrix U of the channel matrix H can be derived in the seventh processing circuit according to the eigenvectors $u_i$, i=1~M.

In addition, according to the above-mentioned disclosure, once eigenvectors $v_i$ are is obtained in the fifth processing circuit 3061, the corresponding eigenvectors $u_i$ are also obtained in the sixth processing circuit 307, and therefore the corresponding singular values $\sigma_i$ can be obtained in the eighth processing circuit 309 by multiplying the channel matrix H by the eigenvectors $v_i$ and the eigenvectors $u_i$ as illustrated in the equation (5). When all of the singular value $\sigma_1$~$\sigma_m$ are obtained, the diagonal matrix Σ can be derived in the ninth processing circuit 3010.

According to the above-mentioned disclosure of the present invention, the computation of the singular value decomposing device 400 is division free and square-root free. In other words, no division or square-root operation are performed in the singular value decomposing device 400 to therefore lower the total computational complexity (i.e., multiplication and add (MAC)) to decompose the channel matrix H and obtain the characteristic of fast-convergence. In addition, the singular value decomposing device 400 is reconfigurable to various sizes of channel matrices, such as a 4*4 matrix or 4*3 matrix. Furthermore, since the eigenvectors $v_i$, $u_i$, and $\sigma_i$ can be derived separately in the embodiment of the present invention, the singular value decomposing device 400 possesses high parallelism compared with the conventional one.

Those skilled in the art will readily observe that numerous modifications and alterations of the device and method may be made while retaining the teachings of the invention.

What is claimed is:

1. A method for performing a singular value decomposition (SVD) upon a matrix, the method comprising:
    (a) simplifying the matrix to derive a simplified matrix;
    (b) using a processing circuit for performing an iterative matrix multiplication upon the simplified matrix to generate an iterated matrix;
    (c) extracting a vector of the iterated matrix according to an iteration number of the iterative matrix multiplication;
    (d) de-correlating the simplified matrix from the vector to update the simplified matrix;
    (e) repeating steps (b), (c), and (d) until a predetermined number of vectors have been derived; and
    (f) storing a first unitary matrix determined according to the predetermined number of vectors in the singular value decomposition.

2. The method of claim 1, wherein step (f) comprises:
    (f-1) normalizing the predetermined number of vectors to derive a plurality of first normalized vectors, respectively; and
    (f-2) storing the first unitary matrix composed of the first normalized vectors.

3. The method of claim 2, further comprising:
    (g) multiplying the matrix by the first normalized vectors to generate a plurality of resultant vectors, respectively; and
    (h) deriving a second unitary matrix of the singular value decomposition, wherein the second unitary matrix is composed of a plurality of second normalized vectors generated from normalizing the resultant vectors, respectively.

4. The method of claim 3, wherein step (g) multiplies the matrix by a normalized vector derived in step (f-1) before all of the first normalized vectors are derived in step (f-1).

5. The method of claim 1, wherein step (a) comprises:
    performing a transpose conjugate operation upon the matrix to generate a transposed matrix; and
    multiplying the matrix by the transposed matrix to generate the simplified matrix.

6. The method of claim 1, wherein step (b) comprises:
    (b-1) multiplying the simplified matrix by the simplified matrix itself to generate the iterated matrix;
    (b-2) re-assigning a word-length for storing the iterated matrix to generate a shifted matrix;
    (b-3) updating the simplified matrix utilizing the shifted matrix; and
    (b-4) repeating steps (b-1), (b-2) and (b-3) until the iteration number is equal to a predetermined value.

7. The method of claim 1, wherein step (d) comprises:
    subtracting the vectors extracted in step (c) by an identity matrix to generate a subtracted matrix; and
    multiplying the subtracted matrix by the simplified matrix to update the simplified matrix.

8. The method of claim 1, further comprising:
    (g) multiplying the matrix by the predetermined number of vectors to generate a plurality of resultant vectors, respectively; and (h) deriving a second unitary matrix composed of a plurality of normalized vectors generated from normalizing the resultant vectors, respectively, and storing the second unitary matrix.

9. The method of claim 8, wherein step (g) multiplies the matrix by one of the predetermined number of vectors to derive a resultant vector before all of the predetermined number of vectors are derived.

10. The method of claim 1, wherein the matrix is a Multi-input Multi-output (MIMO) channel matrix.

11. A singular value decomposing device, for performing a singular value decomposition (SVD) upon a matrix, the singular value decomposing device comprising:
a first processing circuit, for simplifying the matrix to derive a simplified matrix;
a second processing circuit, coupled to the first processing circuit, for performing an iterative matrix multiplication upon the simplified matrix to generate an iterated matrix;
a third processing circuit, coupled to the second processing circuit, for extracting a vector of the iterated matrix according to an iteration number of the iterative matrix multiplication;
a fourth processing circuit, coupled to the third processing circuit, for de-correlating the simplified matrix from the vector to update the simplified matrix;
a switch circuit, coupled between the fourth processing circuit and the second processing circuit, for selectively coupling the simplified matrix to the second processing circuit until a predetermined number of vectors have been derived; and
a storing module, coupled to the third processing circuit, for storing a first unitary matrix determined according to the predetermined number of vectors in the singular value decomposition.

12. The singular value decomposing device of claim 11, wherein the storing module comprises:
a fifth processing circuit, for normalizing the predetermined number of vectors to derive a plurality of first normalized vectors, respectively; and
a storing unit, coupled to the fifth processing circuit, for storing the first unitary matrix composed of the first normalized vectors.

13. The singular value decomposing device of claim 12, further comprising:
a sixth processing circuit, coupled to the storing module, for multiplying the matrix by the first normalized vectors to generate a plurality of resultant vectors, respectively; and
a seventh processing circuit, coupled to the sixth processing circuit, for deriving a second unitary matrix of the singular value decomposition, wherein the second unitary matrix is composed of a plurality of second normalized vectors generated from normalizing the resultant vectors, respectively.

14. The singular value decomposing device of claim 13, wherein the sixth processing circuit multiplies the matrix by a normalized vector derived by the fifth processing circuit before all of the first normalized vectors are derived by the fifth processing circuit.

15. The singular value decomposing device of claim 11, wherein the first processing circuit comprises:
a first arithmetic unit, for performing a transpose conjugate operation upon the matrix to generate a transposed matrix; and
a second arithmetic unit, coupled to the first arithmetic unit, for multiplying the matrix by the transposed matrix to generate the simplified matrix.

16. The singular value decomposing device of claim 11, wherein the second processing circuit comprises:
a third arithmetic unit, for multiplying the simplified matrix by the simplified matrix itself to generate the iterated matrix;
a shifting module, coupled to the third arithmetic circuit, for re-assigning a word-length for storing the iterated matrix to generate a shifted matrix, and updating the simplified matrix utilizing the shifted matrix until the iteration number is equal to a predetermined value.

17. The singular value decomposing device of claim 11, wherein
the fourth processing circuit comprises:
a fourth arithmetic unit, for subtracting the vectors extracted in the third processing circuit by an identity matrix to generate a subtracted matrix; and
a fifth arithmetic circuit, coupled to the fourth arithmetic unit, for multiplying the subtracted matrix by the simplified matrix to update the simplified matrix.

18. The singular value decomposing device of claim 11, further comprising:
an eighth processing circuit, coupled to the storing module, for multiplying the matrix by the predetermined number of vectors to generate a plurality of resultant vectors, respectively; and
a ninth processing circuit, coupled to the eighth processing circuit, for deriving a second unitary matrix composed of a plurality of normalized vectors generated from normalizing the resultant vectors, respectively, and storing the second unitary matrix.

19. The singular value decomposing device of claim 18, wherein the eighth processing circuit multiplies the matrix by one of the predetermined number of vectors to derive a resultant vector before all of the predetermined number of vectors are derived.

20. The singular value decomposing device of claim 11, wherein the matrix is a Multi-input Multi-output (MIMO) channel matrix.

* * * * *